United States Patent
Szillat

(10) Patent No.: US 9,199,230 B2
(45) Date of Patent: Dec. 1, 2015

(54) METHOD FOR THE PRODUCTION OF STABLE BINDER-FREE HIGH-PURITY MOLDINGS COMPOSED OF METAL OXIDES AND THEIR USE

(71) Applicant: Wacker Chemie AG, Munich (DE)

(72) Inventor: Holger Szillat, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 204 days.

(21) Appl. No.: 13/868,298

(22) Filed: Apr. 23, 2013

(65) Prior Publication Data

US 2013/0237413 A1 Sep. 12, 2013

Related U.S. Application Data

(60) Continuation of application No. 13/113,363, filed on May 23, 2011, now Pat. No. 8,518,850, which is a division of application No. 12/518,518, filed as application No. PCT/EP2007/063383 on Dec. 6, 2007, now abandoned.

(30) Foreign Application Priority Data

Dec. 13, 2006 (DE) .......................... 10 2006 058 799

(51) Int. Cl.
| | |
|---|---|
| *B01J 21/00* | (2006.01) |
| *B01J 32/00* | (2006.01) |
| *B01J 35/04* | (2006.01) |
| *C01G 23/00* | (2006.01) |
| *C04B 35/111* | (2006.01) |
| *C04B 35/14* | (2006.01) |
| *C04B 35/46* | (2006.01) |
| *C04B 35/626* | (2006.01) |
| *C09C 1/30* | (2006.01) |
| *C09C 1/40* | (2006.01) |
| *B01J 21/08* | (2006.01) |
| *B01J 23/745* | (2006.01) |
| *B01J 23/75* | (2006.01) |
| *B01J 23/889* | (2006.01) |
| *B01J 2/22* | (2006.01) |

(52) U.S. Cl.
CPC *B01J 32/00* (2013.01); *B01J 21/08* (2013.01); *B01J 23/745* (2013.01); *B01J 23/75* (2013.01); *B01J 23/8896* (2013.01); *B01J 35/04* (2013.01); *C01G 23/00* (2013.01); *C04B 35/111* (2013.01); *C04B 35/14* (2013.01); *C04B 35/46* (2013.01); *C04B 35/62635* (2013.01); *C04B 35/62655* (2013.01); *C09C 1/3018* (2013.01); *C09C 1/407* (2013.01); *C01P 2006/12* (2013.01); *C01P 2006/14* (2013.01); *C01P 2006/22* (2013.01); *C04B 2235/5409* (2013.01); *C04B 2235/6021* (2013.01); *C04B 2235/72* (2013.01); *C04B 2235/721* (2013.01); *C04B 2235/726* (2013.01); *C04B 2235/727* (2013.01); *C04B 2235/96* (2013.01)

(58) Field of Classification Search
None
See application file for complete search history.

(56) References Cited

U.S. PATENT DOCUMENTS

| | | | |
|---|---|---|---|
| 4,052,334 A | 10/1977 | Mockett | |
| 4,482,642 A | 11/1984 | Ettlinger et al. | |
| 4,680,043 A | 7/1987 | Ginter et al. | |
| 5,002,918 A | 3/1991 | Deller et al. | |
| 5,021,378 A | 6/1991 | Deller et al. | |
| 5,063,179 A * | 11/1991 | Menashi et al. | 501/12 |
| 5,086,031 A | 2/1992 | Deller et al. | |
| 5,643,347 A | 7/1997 | Werdecker et al. | |
| 6,207,610 B1 * | 3/2001 | Krause et al. | 502/232 |
| 6,451,862 B1 | 9/2002 | Kusaka et al. | |
| 6,593,270 B1 | 7/2003 | Krause et al. | |
| 6,699,808 B1 | 3/2004 | Schwertfeger et al. | |
| 2004/0106835 A1 | 6/2004 | Gartside et al. | |
| 2005/0129603 A1 | 6/2005 | Szillat et al. | |

FOREIGN PATENT DOCUMENTS

| | | |
|---|---|---|
| DE | 2625705 A1 | 12/1976 |
| DE | 3912504 A1 | 10/1990 |
| DE | 4142898 A1 | 6/1993 |
| DE | 4142902 A1 | 6/1993 |
| DE | 44 24 044 A1 | 1/1996 |
| DE | 199 43 03 A1 | 3/2001 |
| DE | 10211958 A1 | 10/2003 |
| DE | 10247314 A1 | 6/2004 |
| EP | 0072390 A2 | 2/1983 |
| EP | 0172386 A2 | 2/1986 |
| EP | 0327722 A2 | 8/1989 |
| EP | 0327815 A1 | 8/1989 |
| EP | 0393356 A1 | 10/1990 |
| EP | 0807615 A1 | 11/1997 |
| EP | 0916402 A1 | 5/1999 |
| EP | 0 974 557 A1 | 1/2000 |

(Continued)

OTHER PUBLICATIONS

Detlev Koth and Horst Ferch, Chem.-Ing.-Tech. 52 (1980) Nr. 8, S., pp. 628-634.

*Primary Examiner* — Melvin C Mayes
*Assistant Examiner* — Colette Nguyen
(74) *Attorney, Agent, or Firm* — Brooks Kushman P.C.

(57) ABSTRACT

Stable high strength porous metal oxide articles suitable, for example, for use as catalyst supports, are prepared by predisposing fine metal oxide particles in water followed by fine dispersion under high shear, and subjecting the dispersion to a change in pH to coagulate the metal oxide particles and form a moldable viscoelastic composition. The moldings are substantially free of impurity atoms.

18 Claims, No Drawings

(56) References Cited

FOREIGN PATENT DOCUMENTS

| | | | |
|---|---|---|---|
| JP | 2001-139230 | A2 | 5/2001 |
| JP | 2005112649 | A | 4/2005 |
| WO | 02100535 | A1 | 12/2002 |
| WO | 2006052688 | A2 | 5/2006 |

* cited by examiner

METHOD FOR THE PRODUCTION OF STABLE BINDER-FREE HIGH-PURITY MOLDINGS COMPOSED OF METAL OXIDES AND THEIR USE

CROSS-REFERENCE TO RELATED APPLICATIONS

This application is a continuation of U.S. application Ser. No. 13/113,363, filed May 23, 2011, which is a division of U.S. application Ser. No. 12/518,518 filed Jun. 10, 2009 (abandoned), which is the U.S. national phase of PCT/EP2007/063383 filed Dec. 6, 2007 which claims priority to German application DE 10 2006 058 799.5 filed Dec. 13, 2006, all of which are incorporated herein by reference.

BACKGROUND OF THE INVENTION

1. Field of the Invention

The invention relates to the production of stable binder-free high-purity moldings composed of metal oxides, in particular pyrogenic metal oxides, and their use.

2. Description of the Related Art

Pyrogenic metal oxides are extremely finely divided and have high specific surface areas, defined, spherical primary particles having a defined surface chemistry and no internal surface area (pore). Furthermore, they have a very high chemical purity.

In view of the properties just outlined, pyrogenic silicon dioxides, for example, are attracting increasing interest as supports for catalysts (D. Koth, H. Ferch, Chem. Ing. Techn. 52, 628 (1980)).

However, owing to the particular finely divided nature of pyrogenic metal oxides, the production of moldings from these pyrogenic metal oxides is difficult. The production of moldings from metal-oxidic powders is generally carried out by pressing or extrusion using binders and lubricants in order to obtain stable moldings. The binders and lubricants are inorganic and organic additives.

Inorganic additives such as magnesium stearate remain in the moldings produced in the form of inorganic compounds such as magnesium oxide. Organic additives, too, can lead to contaminants such as carbon in the production process of the moldings. The desired very high purity of the pyrogenic metal oxides used, e.g. pyrogenic $SiO_2$, is therefore lost in the moldings produced.

Another source of contamination is the production process itself. It is known that process steps such as milling produce contamination by abrasion on milling vessels, milling tools and milling balls and this contamination is introduced into the material being milled. This also occurs when milling vessels, milling tools and milling balls consist of hard materials such as $Si_3N_4$, $ZrO_2$, $ZrSiO_4$, $Al_2O_3$, and can be explained by the fact that the pyrogenic metal oxides are usually themselves materials having a high hardness of individual particles, e.g. aluminum oxide, silicon dioxide, titanium dioxide and zirconium dioxide.

EP 72390 describes the production of pressed bodies from a mixture of pyrogenic metal oxides, water, silica sol and a pressing auxiliary. A polyfunctional alcohol (e.g. glycerol) is used as auxiliary.

Mixing of pyrogenic silicon dioxide with kaolin and/or graphite, sugar, starch, urea, and aqueous waxes is known from EP 327722. Pressed bodies can be produced using punched presses, eccentric presses, extruders, rotary presses or compactors. According to EP 327815, an analogous procedure is employed but using pyrogenic silicon dioxide/aluminum oxide mixed oxide instead of pyrogenic silicon dioxide.

EP 393356 describes the production of pressed bodies from pyrogenic silicon dioxide, urea, methylcellulose and/or magnesium stearate, graphite, aluminum stearate and water.

EP 807615 discloses a process for producing pressed bodies comprising pyrogenic silicon dioxide, methylcellulose, microwax and polyethylene glycol and water. The pressed bodies usually have contents of 50-90% by weight of silicon dioxide, 0.1-20% by weight of methylcellulose and 0.1-15% by weight of microwax and 0.1-15% by weight of polyethylene glycol.

EP 916402 A1 describes the production of extrudates having a pore volume of from 0.5 to 1.8 ml/g from pyrogenic silicon dioxide. The starting mixture contains water and pyrogenic silicon dioxide with addition of methylhydroxyethylcellulose, wax and polyethylene glycol. The composition obtained by mixing is shaped in a screw extruder to form extrudates.

DE-A 10247314 discloses moldings based on silicon dioxide and/or titanium dioxide which additionally contain glass fibers. The moldings are produced by homogenizing pulverant silicon dioxide and/or titanium dioxide with glass fibers, methylhydroxypropylcellulose, wax emulsion or polyethylene glycol, polysaccharide and polyethylene oxide with addition of water. The resulting composition is shaped to form extrudates.

DE 3912504 discloses a process for producing pressed bodies based on pyrogenic silica, in which aluminum stearate, magnesium stearate and/or graphite are used as lubricant and urea and methyl cellulose are used as pore formers.

According to DE 4142898, it is possible to produce stable moldings from pyrogenic silica and aqueous-alcoholic ammonia solution. On the other hand, a pure aqueous ammonia solution is not successful. The high proportion of aqueous-alcoholic ammonia solution makes the mixture to be shaped strongly alkaline. The use of alcohol produces the risk of carbon contamination in the resulting catalyst support. According to DE 4142902, stable moldings can be produced from pyrogenic silica and ammonia solution or from pyrogenic silica and a silica sol containing alkali metal only when the shaped bodies are subjected to hydrothermal treatment. In the case of addition of ammonia, the mixture is once again made very alkaline. It is known that this excess of base (pH>10) leads to partial dissolution of $SiO_2$.

The documents mentioned show that the production of stable moldings has hitherto not been possible without metallic or organic additives or additional strengthening steps. For this reason, only moldings which have a not inconsiderable proportion of contamination have been known in the field of support materials for catalytic applications. The patent texts US 2004106835 and WO 2006052688 may be mentioned as examples. According to US 2004106835, the total contamination by the elements Mg, Ca, Na, Al and Fe in an $SiO_2$ catalyst support is at best 407 ppm. The $SiO_2$ support which can be produced as described in the patent text WO 2006052688 contains less than 150 ppm of Mg, 900 ppm of Ca, 900 ppm of Na, 200 ppm of Al and 40 ppm of Fe.

SUMMARY OF THE INVENTION

It is an object of the invention to improve the prior art and in particular to provide a process for producing moldings based on metal oxides, in particular pyrogenic metal oxides such as pyrogenic $SiO_2$, and also moldings which have very little contamination by metals, carbon, phosphorus and sulfur and have a high strength. These and other objects are achieved by a process for producing moldings composed of one or more metal oxides, wherein at least one metal oxide is predispersed in water and subsequently finely dispersed, this dispersion is subjected to a change in pH, and shaping and subsequently drying are then carried out.

DETAILED DESCRIPTION OF THE PREFERRED EMBODIMENTS

The process of the invention for producing moldings composed of one or more metal oxides is preferably carried out so that the sum of impurities (all other metals and also carbon and phosphorus and sulfur) in the molding is less than 400 ppm.

To produce the pyrogenic metal oxide, a volatile metal compound, e.g. a metal halide or an organometallic compound, is sprayed into a hydrogen/air flame. This substance hydrolyzes in the presence of the water formed in the hydrogen/oxygen reaction to give the metal oxide. After leaving the flame, the metal oxide enters a coagulation zone in which the primary particles and primary aggregates agglomerate.

The amorphous finely divided pyrogenic metal oxides, e.g. pyrogenic $SiO_2$, have aggregate sizes of from 100 nm to 500 nm, measured by dynamic light scattering. These metal oxides have a BET surface area in the range from 30 to 500 $m^2/g$, preferably from 150 to 450 $m^2/g$, and most preferably from 300 to 400 $m^2/g$. The metal oxide particles are present in highly pure form, i.e. preferably with a proportion of foreign atoms, in particular metals, of ≤15 ppmw (parts per million per weight).

The production of particularly high-purity pyrogenic metal oxide is preferably carried out by a method based on that of DE 10211958.

The second step comprises producing a homogeneous dispersion by dispersing the metal oxide powder in water. For the purposes of the invention, a dispersion is homogeneous when it is preferably substantially free of undispersed agglomerates. According to the present invention, the proportion of agglomerates having diameters greater than 600 nm in the dispersion is less than 10%, preferably less than 1%, and more preferably less than 0.1%, measured by dynamic light scattering on a 0.3% strength dispersion. Undispersed agglomerates cause inhomogeneities in the future ceramic microstructure of the respective application, e.g. as catalyst support. The inhomogeneities can be, for example, density inhomogeneities or inhomogeneities in the pore diameter distribution.

Dispersion can be effected by means of various dispersing apparatuses. The metal oxide powder is firstly stirred into water by means of a high-speed stirrer disk or planetary mixer disk and stirred for at least 25 minutes at a circumferential velocity of at least 5 m/s, preferably at least 8 m/s. This is a predispersing step. The wetting of the metal oxide powder by water should be complete at this stage. The subsequent fine dispersing step serves to break up particles, aggregates and agglomerates and is carried out, for example, by means of a high-speed stirrer, ultrasonic flow cell, planetary mixer, wet jet mill or ball mill designed to give a high purity for at least 25 minutes. The dispersion is most preferably finely dispersed for at least 25 minutes by means of a high-speed stirrer, ultrasonic flow cell, planetary mixer or wet jet mill. The dispersion is most preferably finely dispersed by means of a high-speed stirrer or a planetary mixer for at least 25 minutes at a circumferential velocity of the stirrer disk of at least 10 m/s.

To maintain freedom from abrasion during the dispersion process, the avoidance or high-purity design of contact surfaces between dispersion and dispersing tool is critical. High-purity designs can, for example, involve the use of high-speed stirrer disks, milling media and ultrasonic transducers made of fused silica or planetary tools coated with a high-purity hard polymer. The use of oxide-ceramic milling balls, e.g. $ZrO_2$, $ZrSiO_4$ or $Al_2O_3$, as milling tools is ruled out. On the other hand, particularly hard milling balls which are not critical in terms of contamination, e.g. milling balls made of tungsten carbide, silicon carbide or silicon nitride, can be used. If the principle of high-energy milling by means of a wet jet mill is utilized, contamination is by definition ruled out. According to this principle, predispersed dispersion streams under high pressure are released through a nozzle. The streams impinge precisely on one another and the particles mill themselves.

A low viscosity (e.g. <2 Pa s) and yield point is important for optimal dispersion of the solid particles and a homogeneous dispersion. These can be achieved by changing the pH. In the case of a pyrogenic metal oxide, this can be brought about by addition of an acid.

The dispersions can also be freed of undispersible, unwetted and other coarse particles at the end of the dispersion procedure by sieving.

In the process of the invention, water is used as dispersion medium for the metal oxide particles. Organic solvents are ruled out because of the risk of carbon contamination. Particular preference is given to using water in highly pure form (Fe<2 ppb), as can, for example, be obtained by methods known from the literature or is commercially available. Preference is given to using specially purified water which has a resistance of ≥18 megaohm*cm.

The dispersion preferably has a proportion of pyrogenic metal oxide particles of from 5 to 40% by weight, more preferably from 10 to 30% by weight and most preferably from 15 to 25% by weight. If tableting is carried out as shaping, a significantly higher solids content approaching 100% by weight is chosen. If precipitated metal oxide particles are mixed into the pyrogenic metal oxide particles, it is possible, e.g. in the case of precipitated silica, to increase the solids content in the dispersion relative to the upper limit of a dispersion of exclusively pyrogenic metal oxide particles in water from 40% by weight to up to 65% by weight. Preference is here given to a solids content of from 5% by weight to 65% by weight, more preferably from 15% by weight to 50% by weight, and most preferably from 25% by weight to 35% by weight.

The third process step relates to coagulation of the dispersion by means of a change in the pH, preferably by setting a pH of from 5.0 to 10.0 or from 5.0 to 7.5. The pH adjustment can be carried out with the aid of bases, e.g. NaOH, KOH, $NH_3$. Particular preference is given to using $NH_3$. The dispersion can be converted by addition of $NH_3$ from its homogeneous, stable, fluid range into a range in which the dispersion coagulates and solidifies. The coagulated state can be referred to as a viscoelastic solid, i.e. the storage modulus G' is higher than the loss modulus G".

It has surprisingly been found that the dispersion, preferably after a small addition of $NH_3$, is particularly suitable for shaping. A typical ratio of pyrogenic silicon dioxide to 1% $NH_3$ solution is 45:1. Dispersions of commercial pyrogenic silicon dioxide normally display a pH of from about 3 to 5, depending on the solids content. Stable moldings can be formed when the dispersion is brought to a pH of preferably from 5.0 to 10.0, more preferably from 5.5 to 8.5, yet more preferably from 6.0 to 7.0, still more preferably from 5.5 to 6.9 and most preferably from 6.0 to 6.4. After establishing the above pH, the dispersion sets while stirring within a few minutes and a shapeable composition having viscoelastic behavior is formed.

If the moldings are composed of pyrogenic aluminum oxide, moldings having sufficient stability can be formed when the dispersion is set to a pH range of preferably from 5.0 to 7.5, more preferably from 6.5 to 7.5, and most preferably from 7.0 to 7.5. In the case of moldings composed of pyrogenic titanium dioxide the stability is sufficient when the dispersion is set to a pH range of preferably from 5.0 to 7.5, more preferably from 5.3 to 6.5, and most from 5.6 to 6.0. If the aim is to produce a stable molding composed of pyrogenic zirconium dioxide, the dispersion is set beforehand to a pH range of preferably from 5.0 to 7.5, more preferably from 5.1 to 6.0, and most preferably from 5.3 to 5.7.

Viscoelastic behavior means that in a rheological deformation test carried out in the oscillatory mode, the storage modulus $G'$ is greater than the loss modulus $G''$. The moduli $G'$ and $G''$ can be determined according to the equation $\tau=\gamma(t)*(G' \sin \omega t + G'' \cos \omega t)$, where $\tau$ is the stress response of the sample to the change in the deformation as a function of time $\gamma(t)$ at a maximum amplitude $\gamma_0$ and angular velocity $\omega$, i.e. $\gamma(t)=\gamma_0*\sin \omega t$). The determination of the absolute values of $G'$ and $G''$ is carried out in the plateau region of the storage modulus $G'$. The storage modulus $G'$ should, for the purposes of the invention, be at least 10,000 Pa, preferably at least 50,000 Pa, and the ratio $G''/G'$ should be less than 1, preferably less than 0.55 and most preferably less than 0.25. The respective modulus was measured by means of a plate-plate geometry having a shear gap of 1.5 mm or, in another embodiment, of 2 mm at a temperature of 23° C.

The use of the composition according to the invention is characterized by a particularly high long-term stability of the viscoelastic behavior. This means that the storage modulus $G'$ after a storage time of 1 week at room temperature in a closed container has dropped to not less than 70% of the initial value, preferably to not less than 90% of the initial value, with the modulus being measured by means of a plate-plate geometry having a shear gap of 1.5 mm or, in another embodiment, of 2.0 mm at a temperature of 23° C.

In the fourth process step, the composition is shaped, e.g. preferably by extrusion, tableting or pressing. Here, all apparatuses known to those skilled in the art, e.g. extruders, tableting machines, ram extruders, etc. are conceivable. The geometry of the molding results from the shaping tool selected in each case. It is possible to produce geometries such as rings, pellets, cylinders, wagon wheels, spheres, etc. The length of rings and pellets is defined by use of a cutting apparatus directly after shaping.

After shaping, drying of the molding is carried out in the fifth process step. This is carried out by means of methods known to those skilled in the art (drying oven, IR heating, microwave). Drying is preferably carried out at temperatures of from 25° C. to 200° C., more preferably from 30° C. to 100° C., and most preferably from 40° C. to 80° C. The drying time depends on the ratio of metal oxide to water but is preferably in the range from 2 to 24 hours.

After drying, calcination of the molding can be carried out by methods known to those skilled in the art in a last step. Preference is given to a calcination under an air atmosphere in a furnace. The air can have a further gas mixed into it. Various protective gases are possible for this purpose. Suitable protective gases are all protective gases known to those skilled in the art, most preferably nitrogen, argon or helium. The air can likewise be replaced completely by the protective gas. The calcination is carried out at temperatures in the range from 500° C. to 1250° C., preferably from 700° C. to 1100° C. and most preferably from 850° C. to 1000° C. The calcination time is in the range from 0.5 to 10 hours; a typical calcination time is 2 hours. The calcination can be carried out under atmospheric pressure or under reduced pressure.

As a result of the calcination step, the surface area of the catalyst support, which is an important parameter for the catalytic process, is reduced. Since, however, the support materials of the invention display satisfactory stability even without calcination or after calcination at low temperatures because of their excellent homogeneity, they have not only a relatively high purity but also significantly higher support surface areas and pore volumes compared to the prior art.

The invention further provides a stable, binder-free, high-purity molding composed of metal oxides, characterized in that the molding preferably has a sum of impurities (all metals and also carbon and phosphorus and sulfur) of less than 100 ppm, the compressive strength is at least 2 N/mm$^2$ and the proportion of spalling in the presence of liquids or gases is less than 5% by weight.

It is characterized by being free of inorganic and organic impurities both in the sintered state and in the green state. The present invention relates to a stable molding, characterized in that the molding preferably has a sum of impurities (all metals and also carbon and phosphorus and sulfur) of less than 400 ppm, more preferably less than 250 ppm, yet more preferably less than 100 ppm, still more preferably less than 50 ppm and most preferably less than 20 ppm. Even more preferably, the molding has a sum of impurities (all metals and also phosphorus and sulfur and carbon) of less than 10 ppm and most preferably less than 1 ppm.

Furthermore, the molding is, in a preferred embodiment, characterized in that the sum of sulfur and phosphorus is preferably not more than 5 ppm, more preferably not more than 0.5 ppm. The carbon contamination is preferably below 50 ppm, more preferably below 1 ppm. In addition, the molding contains maximum impurities summed over all metals of preferably 80 ppm, more preferably not more than 20 ppm.

A particular aspect of the invention is the fact that despite the high purity of the composition, which normally leads to a low viscosity, pronounced viscoelastic behavior is present. In contrast thereto, it is known from the prior art that, in particular, impurities, additives or dopants are responsible for an increase in the viscosity and the viscoelastic behavior. Such impurities include, inter alia, the abovementioned binders but also metallic impurities. The composition and the molding are thus free of inorganic and organic binders, e.g. glycerol, kaolin, sugar, starch, urea, wax, methylcellulose, magnesium stearate, graphite, aluminum stearate, polyethylene glycol, polyethylene oxide.

It is likewise important that the molding retains its shape defined by the molding tool at the moment of production. Deformation during and immediately after shaping results in density differences and stresses which during the drying and sintering process lead to defects (spalling, fine dust) on the molding. The supports produced have, according to the invention, a proportion of spalling of preferably less than 5% by weight, more preferably less than 1% by weight and most preferably less than 0.5% by weight.

The molding of the invention can generally be used in all processes or working steps known to those skilled in the art in which the properties of the molding and in particular the porous material present in the molding are desired. The molding of the invention is most preferably used as catalyst in chemical reactions or serves as support material onto which the respective active components matched to the process are applied.

The process relates not only to pyrogenic metal oxides such as pyrogenic $SiO_2$, $Al_2O_3$, $ZrO_2$ and $TiO_2$ but also encompasses metal oxides in general of the $SiO_2$, $Al_2O_3$, $ZrO_2$ and $TiO_2$ type, even though pyrogenic metal oxides are preferred because of their finely divided nature.

Owing to the high purity of the starting powders and the high-purity production process, targeted doping of each high-purity metal oxide with another high-purity metal oxide is possible without the total purity claimed being lost as a result. A preferred example is the production of acidic catalyst supports by doping of pyrogenic $SiO_2$ with pyrogenic $Al_2O_3$. This doping creates Lewis-acid sites in the $SiO_2$. In this sense, high-purity mixed oxides doped with any of the high-purity oxides $SiO_2$, $Al_2O_3$, $ZrO_2$ and $TiO_2$ or any mixtures thereof can be produced from the preferably high-purity oxides $SiO_2$, $Al_2O_3$, $ZrO_2$ and $TiO_2$. The total purity described always relate to the main constituent. If, for example, $SiO_2$ is doped with $Al_2O_3$ and $TiO_2$, Si and O are main constituents. The impurities are then the elements carbon, phosphorus, sulfur and all metals apart from Si, with the sum of impurities (all other metals and also carbon and phosphorus and sulfur) being less than 400 ppm. If, for example, pyrogenic $SiO_2$ is admixed with, for example, precipitated silica or fused silica, Si and O are also to be considered as main constituents here.

The high purity of the undoped moldings produced also allows doping with other inorganic dopants. A condition is that the sum of impurities, i.e. all elements apart from Si and O, is always less than 400 ppm, preferably less than 250 ppm, more preferably less than 100 ppm and most preferably less than 50 ppm. As dopants, it is possible to choose inorganic metal salts. These can be, for example, halides, oxides, nitrates, nitrites, silicates, carbonates, borates, aluminates, molybdates, tungstates, vanadates, niobates, tantalates, titanates or zirconates. Possible counterions to this anionic component are in principle any cationic species. Preference is given to a cation from the group consisting of alkali metal and alkaline earth metal ions. Very particular preference is given to using an alkali metal cation.

In two specific embodiments, high-purity $SiO_2$ is mixed with high-purity $Al_2O_3$ or high-purity $SiO_2$ is mixed with high-purity $TiO_2$ in any ratios. In these cases, Si and Al or Si and Ti count as main constituents. The elements carbon, phosphorus, sulfur and all metals apart from Si and Al or Si and Ti are considered to be impurities.

The use of finely divided oxides results in formation of moldings having high surface areas. The BET surface areas achieved are preferably in the range from 30 $m^2/g$ to 500 $m^2/g$, more preferably from 150 $m^2/g$ to 450 $m^2/g$ and most preferably from 250 $m^2/g$ to 400 $m^2/g$. The finely divided oxides also result in production of a molding having a high pore volume which is preferably in the range from 0.5 ml/g to 1.8 ml/g, more preferably from 0.7 ml/g to 1.25 ml/g and most preferably from 0.9 ml/g to 1.2 ml/g.

Fine-pored moldings can be formed from the finely divided metal oxides by means of calcination. The proportion of pores having a diameter in the range from 10 nm to 20 nm is typically more than 50%, preferably more than 70% and most preferably more than 80%.

The molding in the dried green state already has a high dimensional stability and a strength of greater than 2 $N/mm^2$, preferably greater than 10 $N/mm^2$, at a BET surface area of from 50 $m^2/g$ to 500 $m^2/g$, preferably from 250 $m^2/g$ to 450 $m^2/g$, a pore volume of from 0.7 ml/g to 1.8 ml/g, preferably from 1 ml/g to 1.6 ml/g, and a proportion of pores having diameters of from 20 nm to 100 nm of at least 20%, preferably at least 50%, more preferably at least 75%. In the calcined state, the strength is higher, preferably greater than 10 $N/mm^2$, more preferably greater than 30 $N/mm^2$, and most preferably greater than 100 $N/mm^2$, at a BET surface area of from 30 $m^2/g$ to 400 $m^2/g$, a pore volume of from 0.5 ml/g to 1.5 ml/g, preferably from 0.7 ml/g to 1.2 ml/g and a proportion of pores having diameters of from 5 nm to 20 nm of at least 50%, preferably at least 75%, most preferably at least 85%. A monomodal pore size distribution is present both in the dried green state and in the calcined state.

For the purposes of the invention, dimensional stability also means that the support displays no more than 5% by weight, preferably no more than 1% by weight and most preferably no more than 0.5% by weight, of spalling phenomena on contact with gases or liquids such as water over a period of at least 48 hours. This is important both for the impregnation of the support with active substance and for use in a chemical reactor. Spalling can bring about a high pressure drop in the reactor during use.

The moldings of the invention are characterized in that they are produced without the customary addition of auxiliaries/additives, for example extrusion auxiliaries, pore formers or sols. The omission of auxiliaries enables the high chemical purity of the (for example pyrogenic) metal oxides to be retained. The support form of the materials is not critical for the process of the invention. Whether the active components are added before the shaping step for the paste-like composition and are thus more or less finely dispersed on the support material straight after the shaping step or are applied only after the final manufacture of the catalyst support in a subsequent process step, e.g. by impregnation, is likewise not critical for the invention.

The invention further provides a catalyst support which is a stable, binder-free, high-purity molding composed of metal oxides. This molding serves as support for catalytic active substances. The catalytically active substance can either be mixed in during production of the molding or be incorporated into the molding only after production of the molding, e.g. by impregnation.

The catalytically active substances which can be supported by the moldings described in the present invention include metals such as Pd, Au, Pt, Ru, Rh, Re, Ni, Fe, Co, Cu, Mo, Sn and Ag, oxides such as $V_2O_5$, $MoO_3$, $WO_3$, $P_2O_5$, $Nb_2O_5$, $Ta_2O_5$, $Bi_2O_3$, $TiO_2$, $Al_2O_3$, $Cr_2O_3$, $ZrO_2$, CoO, NiO, $MnO_2$, $Fe_2O_3$, $Sb_2O_3$, $SnO_2$, $CeO_2$, CuO, MgO and ZnO, zeolites, bismuth molybdate, $K_2S_2O_7$, copper acetylide, phosphine complexes, carbonyl complexes, halides such as copper chloride, palladium chloride, aluminum chloride, $BF_3$, $SbF_5$, acids such as HF, $H_3PO_4$, $CF_3SO_3H$, nafion, sulfated zirconium dioxide, polysulfonic acids and heteropolyacids and also organic compounds such as enzymes, silanes, methylaluminoxane and metallocenes. The catalysts mentioned here can be supported either alone or in the form of any mixtures by the molding. The catalyst comprising support material and active substance can be used for various catalytically aided reactions, but in particular in chemical synthesis. This refers to reactions such as alkylations, isomerizations, polymerizations, hydrogenation, oxidation reactions, hydrations, Fischer-Tropsch synthesis and acetoxylations.

The molding of the invention can be employed for catalytic reactions even in the green state, i.e. only dried and not calcined.

The BET surface area is preferably determined by means of nitrogen in accordance with DIN 66131.

The pore size distribution is preferably determined by means of mercury porosimetry. The determination of the pore volume is preferably carried out in accordance with DIN 66134 (Langmuir, $p/p_0=0.9995$). The strength is preferably determined by means of the universal testing machine Z 400

E using a 1 kN force transducer. The strengths reported in the examples were measured on horizontal and upright moldings. The strength is based on the surface area in mm² on which the molding rests during the measurement. The determination of the viscoelastic functions G' and G" and the viscosity is preferably carried out using a Haake RS600 rheometer having a plate-plate arrangement at a plate diameter of 35 mm and a shear gap of 1.5 mm or, in another embodiment, of 2 mm at 23° C. The shear stress is 1 Pa. The measurement cycle is as follows: oscillation at 3.183 Hz for 120 s, rotation at 1000 revolutions in 30 s, oscillation at 3183 Hz for 1000 s. The plateau of the second oscillation measurement is employed for the evaluation.

The percentage of spalling is preferably determined by sieving. It is the proportion by weight which goes through a tumbling sieve, based on the total weight of the chosen batch of moldings. The sieve opening is 80% of the smallest area of the molding.

The measurement of the pH of the metal oxide dispersion is carried out by a modification of DIN 787/9 using a 4% strength by weight aqueous dispersion instead of a 5% strength by weight aqueous dispersion.

The impurities are preferably determined by the ICP analytical method (inductively coupled plasma, instrument ICP-MS HP4500 or ICP-AES Optima 3000).

The detection limit of the method is less than 1 ppb (ICP/MS) or less than 0.5 ppm (ICP/AES).

The determination of the carbon contamination is preferably carried out on a Leco CS230 and Leco GC-TOF instrument.

circumferential velocity of the high-speed stirrer disk of 12 m/s for 30 minutes. The resulting dispersion is dispersed by means of a Hielscher UP400S ultrasonic flow cell (400 W, 24 kHz) using an ultrasonic transducer made of fused silica. The dispersion is circulated for 20 minutes. The slip is transferred into a planetary mixer having 2 plastic-coated bar stirrers. 4.5 g of 1% $NH_3$ solution are added dropwise at 100 rpm. After the addition is complete, the mixture is stirred for another 10 minutes. The mixture is then introduced into a ram extruder. In parallel, the rheology and pH of a sample are measured: G'=60,000, G"=10,000, pH=6.2.

The composition is extruded to the desired shapes in a ram extruder through a suitable tool and cut to the desired length of the molding. The moldings obtained, in this case pellets having a length of 6 mm, a diameter of 6 mm, are dried at a temperature of 85° C. for 24 hours. The moldings according to the invention have a surface area (BET surface area) of 290 m²/g and a pore volume of 1.1 ml/g. The mechanical strength of the pellets is 11 N/mm². The corresponding purity values are shown in table 1.

Example 2

1155 g of twice-distilled $H_2O$ are placed in a 4 liter plastic beaker. 345 g of pyrogenic silicon dioxide (BET surface area 400 m²/g) are stirred in at 1000 rpm by means of a plastic-coated high-speed stirrer disk. The mixture is subsequently stirred for another 40 minutes at a circumferential velocity of 14 m/s. The slip is then transferred to a planetary mixer having 2 plastic-coated bar stirrers. 7.5 g of 1% $NH_3$ solution

TABLE 1

Impurities in the pyrogenic silicon oxides in ppb, in the support produced in the respective example (B1-B16) in ppm and the comparative support K1 (produced as described in US 2004106835) or K2 (produced as described in WO 2006052688) in ppm determined by ICP/MS (nd = not detectable, MC = main constituent).

| Ex. | Cu | Fe | Ti | Al | Ca | Mg | Na | K | Ni | Cr | C | P | S |
|---|---|---|---|---|---|---|---|---|---|---|---|---|---|
| HDK | 4 | 730 | <1 | 62 | 66 | 134 | 19 | 9 | 167 | 235 | nd | 60 | nd |
| HDK$_{hr}$ | <1 | 25 | 2 | 31 | 64 | 11 | 11 | 5 | 2 | 2 | nd | nd | nd |
| B1 | 0.01 | 1 | 0.03 | 0.3 | 0.3 | 0.2 | 0.2 | 0.1 | 0.3 | 0.3 | nd | 0.06 | nd |
| B2 | 0.01 | 1 | 0.02 | 0.1 | 0.2 | 0.2 | 0.1 | 0.1 | 0.2 | 0.3 | nd | 0.06 | nd |
| B3 | 0.03 | 2 | 0.05 | 0.3 | 0.4 | 0.3 | 0.3 | 0.2 | 0.5 | 0.3 | nd | 0.06 | nd |
| B4 | 0.03 | 2 | 0.05 | 0.3 | 0.4 | 0.3 | 0.2 | 0.1 | 0.5 | 0.3 | nd | 0.06 | nd |
| B5 | 0.01 | 0.3 | 0.01 | 0.1 | 0.1 | 0.04 | 0.1 | 0.02 | 0.08 | 0.02 | nd | 0.01 | nd |
| B6 | 0.03 | 0.3 | 0.05 | 0.3 | 0.2 | 0.1 | 0.1 | 0.03 | 0.2 | 0.1 | nd | 0.02 | nd |
| B7 | 0.1 | 8 | 1 | 60 | 2 | 1 | 5 | 0.5 | 1 | 1 | 10 | 0.5 | 0.5 |
| B8 | 0.1 | 5 | 63 | 2 | 2 | 1 | 4 | 0.5 | 1 | 1 | 10 | 1 | 1 |
| B9 | 0.1 | 5 | 5 | 3 | 4 | 1 | 5 | 1 | 1 | 1 | 10 | 0.4 | 1 |
| B10 | 0.04 | 3 | 0.07 | 0.5 | 0.5 | 0.4 | 0.5 | 0.2 | 0.8 | 0.4 | 5 | 0.1 | 0.7 |
| B11 | 0.03 | 1 | 0.05 | 0.2 | 0.3 | 0.2 | 0.1 | 0.1 | 0.4 | 0.1 | nd | 0.05 | nd |
| B13 | 0.1 | 10 | 0.1 | 1 | 5 | 2 | 6 | 0.5 | 2 | 1 | 40 | 1 | 2 |
| B14 | 0.02 | 1 | 0.04 | 0.2 | 0.2 | 0.1 | 0.1 | 0.05 | 0.3 | 0.1 | nd | 0.06 | nd |
| B15 | 0.03 | 2 | 0.05 | 0.3 | 0.4 | 0.3 | 74 | 2 | 0.5 | 0.3 | nd | 0.06 | nd |
| B16 | 0.03 | 2 | 0.05 | 0.3 | 0.4 | 0.3 | 3 | 70 | 0.5 | 0.3 | nd | 0.06 | nd |
| B17 | 0.1 | 10 | 2 | MC | 5 | 3 | 10 | 0.5 | 2 | 1 | 25 | 1 | 2 |
| B18 | 0.1 | 5 | MC | 4 | 3 | 1 | 5 | 0.5 | 1 | 1 | 20 | 1 | 1 |
| K1 | | 10 | | 100 | 95 | 55 | 147 | | | | | | |
| K2 | | 40 | | 200 | 900 | 150 | 900 | | | | | | |
| B19 | 0.03 | 4 | 0.05 | 1.1 | 1.2 | 0.3 | 49 | 4 | 0.5 | 0.3 | nd | 0.06 | nd |
| B20 | 0.03 | 3 | 0.1 | 0.4 | 0.4 | 0.3 | 0.2 | 0.1 | 0.5 | 0.3 | nd | 0.06 | nd |
| B21 | 0.03 | 4 | 0.05 | 2 | 0.5 | 0.3 | 0.4 | 0.2 | 0.5 | 0.3 | nd | 0.06 | nd |

EXAMPLES

Example 1

300 g of pyrogenic silicon dioxide (BET surface area 300 m²/g) are dispersed in 1200 g of twice-distilled $H_2O$ by means of a high-speed stirrer. The dispersion is after-dispersed at a are added dropwise at 100 rpm. After the addition is complete, the mixture is stirred for another 5 minutes. The mixture is then introduced into a ram extruder. In parallel, the rheology and pH of a sample are measured: G'=200,000, G"=25,000, pH=6.1.

The composition is extruded to the desired shapes in a ram extruder through a suitable tool and cut to the desired length of the molding. The moldings obtained, in this case pellets having a length of 6 mm, a diameter of 6 mm, are dried at a temperature of 85° C. for 24 hours. The moldings according to the invention have a surface area (BET surface area) of 350 m$^2$/g and a pore volume of 1.1 ml/g. The mechanical strength of the pellets is 15 N/mm$^2$. The corresponding purity values are shown in table 1.

Example 3

The production of the support is analogous to example 2. The support is subsequently also sintered at 950° C. The moldings according to the invention have a surface area (BET surface area) of 300 m$^2$/g and a pore volume of 1.0 ml/g. The mechanical strength of the pellets is 42 N/mm$^2$. The corresponding purity values are shown in table 1.

Example 4

The production of the support is analogous to example 2. The support is subsequently also sintered at 1060° C. The moldings according to the invention have a surface area (BET surface area) of 205 m$^2$/g and a pore volume of 0.75 ml/g. The mechanical strength of the pellets is 261 N/mm$^2$. The corresponding purity values are shown in table 1.

Example 5

1140 g of twice-distilled H$_2$O are placed in a 4 liter plastic beaker. 360 g of pyrogenic silicon dioxide (BET surface area 400 m$^2$/g, prepared according to Wa 10203, high-purity) are stirred in at 800 rpm by means of a high-speed stirrer disk made of fused silica. The mixture is subsequently stirred for another 40 minutes at a circumferential velocity of 12 m/s of the high-speed stirrer disk. The slip is transferred to a planetary mixer having 2 plastic-coated bar stirrers. 8.5 g of 1% NH$_3$ solution are added dropwise at 100 rpm. After the addition is complete, the mixture is stirred for another 3 minutes. The mixture is then introduced into a ram extruder. In parallel, the rheology and pH of a sample are measured: G'=120,000, G"=20,000, pH=6.0.

The composition is extruded to the desired shapes in a ram extruder through a suitable tool and cut to the desired length of the molding of 6 mm. The moldings obtained, in this case pellets having a length of 8 mm and a diameter of 6 mm, are dried at a temperature of 85° C. for 24 hours. The moldings according to the invention have a surface area (BET surface area) of 340 m$^2$/g and a pore volume of 1.1 ml/g. The mechanical strength of the pellets is 16 N/mm$^2$. All production steps are carried out under clean room conditions. The corresponding purity values are shown in table 1.

Example 6

The production of the support is analogous to example 5. The support is subsequently also sintered at 950° C. The moldings according to the invention have a surface area (BET surface area) of 310 m$^2$/g and a pore volume of 1.0 ml/g. The mechanical strength of the pellets is 49 N/mm$^2$. The corresponding purity values are shown in table 1.

Example 7

23.1 kg of twice-distilled H$_2$O are placed in a 60 liter plastic beaker. 6.9 kg of pyrogenic silicon dioxide (BET surface area 400 m$^2$/g) are stirred in at 1000 rpm by means of a plastic-coated high-speed stirrer disk. The mixture is subsequently stirred for another 25 minutes at a circumferential velocity of the high-speed stirrer disk of 10 m/s. 0.5 g of aluminum oxide Disperal P2 (commercially available from Sasol) are added. The mixture is subsequently stirred for another 30 minutes at a circumferential velocity of the high-speed stirrer disk of 12 m/s. The slip is transferred to a planetary mixer having 2 plastic-coated bar stirrers. 170 g of 1% NH$_3$ solution are added dropwise at 100 rpm. After the addition is complete, the mixture is stirred for another 5 minutes. The mixture is then introduced into a ram extruder. In parallel, the rheology and pH of a sample are measured: G'=270,000, G"=30,000, pH=6.8.

The composition is extruded to the desired shapes in a ram extruder through a suitable tool and cut to the desired length of the molding. The moldings obtained, in this case pellets having a length of 6 mm and a diameter of 6 mm, are dried at a temperature of 85° C. for 24 hours. The moldings according to the invention have a surface area (BET surface area) of 330 m$^2$/g and a pore volume of 1.1 ml/g. The support is subsequently also sintered at 1040° C. The moldings according to the invention have a surface area (BET surface area) of 200 m$^2$/g and a pore volume of 0.85 ml/g. The mechanical strength of the pellets is 113 N/mm$^2$.

Example 8

23.1 kg of twice-distilled H$_2$O are placed in a 60 liter plastic beaker. 6.9 kg of pyrogenic silicon dioxide (BET surface area 400 m$^2$/g) are stirred in at 1000 rpm by means of a plastic-coated high-speed stirrer disk. The mixture is subsequently stirred for another 25 minutes at a circumferential velocity of the high-speed stirrer disk of 10 m/s. 0.5 g of pyrogenic titanium dioxide (BET surface area 350 m$^2$/g) are added. The mixture is subsequently stirred for another 30 minutes at a circumferential velocity of the high-speed stirrer disk of 12 m/s. The slip is transferred to a planetary mixer having 2 plastic-coated bar stirrers. 140 g of 1% NH$_3$ solution are added dropwise at 100 rpm. After the addition is complete, the mixture is stirred for another 5 minutes. The mixture is then introduced into a ram extruder. In parallel, the rheology and pH of a sample are measured: G'=230,000, G"=27,000, pH=6.5.

The composition is extruded to the desired shapes in a ram extruder through a suitable tool and cut to the desired length of the molding. The moldings obtained, in this case rings having a length of 6 mm, an external diameter of 6 mm and a central hole of 3 mm, are dried at a temperature of 85° C. for 24 hours. The ring support bodies according to the invention have a BET surface area of 340 m$^2$/g and a pore volume of 1.1 ml/g. The support is subsequently also sintered at 950° C. The ring support bodies according to the invention have a surface area (BET surface area) of 300 m$^2$/g and a pore volume of 1.0 ml/g. The mechanical strength of the rings is 28 N/mm$^2$.

Example 9

23.1 kg of twice-distilled H$_2$O are placed in a 60 liter plastic beaker. 6.9 kg of pyrogenic silicon dioxide (BET surface area 400 m$^2$/g) are stirred in at 1000 rpm by means of a plastic-coated high-speed stirrer disk. The mixture is subsequently stirred for another 25 minutes at a circumferential velocity of the high-speed stirrer disk of 10 m/s. 0.5 g of pyrogenic zirconium dioxide (BET surface area 70 m$^2$/g) are added. The mixture is subsequently stirred for another 30 minutes at a circumferential velocity of the high-speed stirrer disk of 12 m/s. The slip is transferred to a planetary mixer having 2 plastic-coated bar stirrers. 120 g of 1% NH$_3$ solution are added dropwise at 100 rpm. After the addition is complete, the mixture is stirred for another 5 minutes. The mixture is then introduced into a ram extruder. In parallel, the rheology and pH of a sample are measured: G'=240,000, G"=28,000, pH=6.2.

The composition is extruded to the desired shapes in a ram extruder through a suitable tool and cut to the desired length of the molding. The moldings obtained, in this case rings having a length of 6 mm, an external diameter of 6 mm and a central hole of 3 mm, are dried at a temperature of 85° C. for 24 hours. The ring support bodies according to the invention have a surface area (BET surface area) of 310 m$^2$/g and a pore volume of 1.1 ml/g. The support is subsequently also sintered at 950° C. The ring shaped bodies according to the invention have a surface area (BET surface area) of 280 m$^2$/g and a pore volume of 1.0 ml/g. The mechanical strength of the rings is 30 N/mm$^2$.

Example 10

1155 g of twice-distilled H$_2$O are placed in a 4 liter plastic beaker. 310 g of pyrogenic silicon dioxide (BET surface area 400 m$^2$/g) are stirred in at 1000 rpm by means of a plastic-coated high-speed stirrer disk. The mixture is subsequently stirred for another 25 minutes at a circumferential velocity of the high-speed stirrer disk of 10 m/s. 35 g of Sipernat 50S precipitated silica (commercially available from Degussa) are added. The mixture is subsequently stirred for another 30 minutes at a circumferential velocity of the high-speed stirrer disk of 10 m/s. The slip is transferred to a planetary mixer having 2 plastic-coated bar stirrers. 4.5 g of 1% NH$_3$ solution are added dropwise at 100 rpm. After the addition is complete, the mixture is stirred for another 5 minutes. The mixture is then introduced into a ram extruder. In parallel, the rheology and pH of a sample are measured: G'=280,000, G"=31,000, pH=6.6.

The composition is extruded to the desired shapes in a ram extruder through a suitable tool and cut to the desired length of the molding. The moldings obtained, in this case pellets having a length of 6 mm and a diameter of 6 mm, are dried at a temperature of 85° C. for 24 hours. The moldings according to the invention have a surface area (BET surface area) of 380 m$^2$/g and a pore volume of 1.2 ml/g. The support is subsequently also sintered at 1035° C. The moldings according to the invention have a surface area (BET surface area) of 230 m$^2$/g and a pore volume of 0.9 ml/g. The mechanical strength of the pellets is 121 N/mm$^2$.

Example 11

1155 g of twice-distilled H$_2$O are placed in a 4 liter plastic beaker. 330 g of pyrogenic silicon dioxide (BET surface area 400 m$^2$/g) are stirred in at 1000 rpm by means of a plastic-coated high-speed stirrer disk. The mixture is subsequently stirred for another 25 minutes at a circumferential velocity of the high-speed stirrer disk of 10 m/s. 50 g of fused silica (particle size 100 μm) are added. The mixture is subsequently stirred for another 20 minutes at 1000 rpm. The slip is transferred to a planetary mixer having 2 plastic-coated bar stirrers. 6 g of 1% NH$_3$ solution are added dropwise at 100 rpm. After the addition is complete, the mixture is stirred for another 5 minutes. The mixture is then introduced into a ram extruder. In parallel, the rheology and pH of a sample are measured: G'=130,000, G"=20,000, pH=6.5.

The composition is extruded to the desired shapes in a ram extruder through a suitable tool and cut to the desired length of the molding. The moldings obtained, in this case pellets having a length of 8 mm and a diameter of 6 mm, are dried at a temperature of 85° C. for 24 hours. The moldings according to the invention have a surface area (BET surface area) of 300 m$^2$/g and a pore volume of 0.9 ml/g. The support is subsequently also sintered at 1050° C. The moldings according to the invention have a surface area (BET surface area) of 210 m$^2$/g and a pore volume of 0.8 ml/g. The mechanical strength of the pellets is 155 N/mm$^2$.

Example 12

145 g of twice-distilled H$_2$O are placed in a 500 ml plastic beaker. 45 g of pyrogenic aluminum oxide (BET surface area 110 m$^2$/g) are stirred in at 1000 rpm by means of a plastic-coated high-speed stirrer disk. The mixture is subsequently stirred for another 40 minutes at a circumferential velocity of the high-speed stirrer disk of 11 m/s. The slip is transferred to a planetary mixer having 2 plastic-coated bar stirrers. 1 g of 1% NH$_3$ solution is added dropwise at 100 rpm. After the addition is complete, the mixture is stirred for another 10 minutes. The mixture is then introduced into a ram extruder. In parallel, the rheology and pH of a sample are measured: G'=10,000 G"=800, pH=7.3.

The composition is extruded to the desired shapes in a ram extruder through a suitable tool and cut to the desired length of the shaped bodies. The shaped bodies obtained, in this case rings having a length of 5 mm, an external diameter of 5 mm and a central hole of 2.5 mm, are dried at a temperature of 85° C. and an atmospheric humidity of 50% for 24 hours. The ring support bodies according to the invention have a surface area (BET surface area) of 100 m$^2$/g and a pore volume of 0.75 ml/g. The mechanical strength of the rings is 9 N/mm$^2$.

Example 13

300 g of pyrogenic silicon dioxide (BET surface area 400 m$^2$/g) are dispersed in 1200 g of twice-distilled H$_2$O by means of a high-speed stirrer. The dispersion is after-dispersed at a circumferential velocity of the high-speed stirrer disk of 12 m/s for 30 minutes. The particles in the resulting dispersion are milled by means of a stirred ball mill using 2 mm fused silica milling beads at an angular velocity of the stirrer of 8 m/s and a degree of fill with milling beads of 60% for 4 hours. The slip is transferred to a planetary mixer having 2 plastic-coated bar stirrers. 3.5 g of 1% NH$_3$ solution are added dropwise at 100 rpm. After the addition is complete, the mixture is stirred for another 10 minutes. The mixture is then introduced into a ram extruder. In parallel, the rheology and pH of a sample are measured: G'=130,000, G"=23,000, pH=6.2.

The composition is extruded to the desired shapes in a ram extruder through a suitable tool and cut to the desired length of the molding. The moldings obtained, in this case pellets having a length of 6 mm and a diameter of 6 mm, are dried at a temperature of 85° C. for 24 hours. The moldings according to the invention have a surface area (BET surface area) of 330 m$^2$/g and a pore volume of 1.1 ml/g. The mechanical strength of the pellets is 22 N/mm$^2$. The corresponding purity values are shown in table 1.

Example 14

300 g of pyrogenic silicon dioxide (BET surface area 400 m$^2$/g) are dispersed in 1200 g of twice-distilled H$_2$O by means of a high-speed stirrer. The dispersion is after-dispersed at a circumferential velocity of the high-speed stirrer disk of 12 m/s for 30 minutes. The particles in the resulting dispersion are comminuted at a pressure of 1000 bar by means of an Ultimaizer HJP-25050 wet jet mill. The slip is transferred to a planetary mixer having 2 plastic-coated bar stirrers. 4.5 g of 1% $NH_3$ solution are added dropwise at 100 rpm. After the addition is complete, the mixture is stirred for another 5 minutes. The mixture is then introduced into a ram extruder. In parallel, the rheology and pH of a sample are measured: G'=50,000, G"=10,000, pH=6.2.

The composition is extruded to the desired shapes in a ram extruder through a suitable tool and cut to the desired length of the molding. The moldings obtained, in this case pellets having a length of 6 mm and a diameter of 6 mm, are dried at a temperature of 85° C. for 24 hours. The moldings according to the invention have a surface area (BET surface area) of 370 $m^2/g$ and a pore volume of 1.1 ml/g. The mechanical strength of the pellets is 17 $N/mm^2$. The corresponding purity values are shown in table 1.

Example 15

1155 g of twice-distilled $H_2O$ are placed in a 4 liter plastic beaker. 345 g of pyrogenic silicon dioxide (BET surface area 400 $m^2/g$) are stirred in at 1000 rpm by means of a plastic-coated high-speed stirrer disk. The mixture is subsequently stirred for another 25 minutes at a circumferential velocity of the high-speed stirrer disk of 10 m/s. The slip is transferred to a planetary mixer having 2 plastic-coated bar stirrers. 1 g of 1% NaOH solution is added dropwise at 100 rpm. After the addition is complete, the mixture is stirred for another 10 minutes. The mixture is then introduced into a ram extruder. In parallel, the rheology and pH of a sample are measured: G'=165,000, G"=25,000, pH 5.7.

The composition is extruded to the desired shapes in a ram extruder through a suitable tool and cut to the desired length of the shaped body. The shaped bodies obtained, in this case rings having a length of 5 mm, an external diameter of 5 mm and a central hole of 2.5 mm, are dried at a temperature of 85° C. for 24 hours. The ring support bodies according to the invention have a surface area (BET surface area) of 300 $m^2/g$ and a pore volume of 1.1 ml/g. The support is subsequently also sintered at 1020° C. The ring support bodies according to the invention have a surface area (BET surface area) of 240 $m^2/g$ and a pore volume of 0.9 ml/g. The mechanical strength of the rings is 45 $N/mm^2$.

Example 16

1155 g of twice-distilled $H_2O$ are placed in a 4 liter plastic beaker. 345 g of pyrogenic silicon dioxide (BET surface area 200 $m^2/g$) are stirred in at 1000 rpm by means of a plastic-coated high-speed stirrer disk. The mixture is subsequently stirred for another 25 minutes at a circumferential velocity of the high-speed stirrer disk of 10 m/s. The slip is transferred to a planetary mixer having 2 plastic-coated bar stirrers. 1 g of 1% KOH solution is added dropwise at 100 rpm. After the addition is complete, the mixture is stirred for another 10 minutes. The mixture is then introduced into a ram extruder. In parallel, the rheology and pH of a sample are measured: G'=155,000, G"=25,000, pH=5.8.

The composition is extruded to the desired shapes in a ram extruder through a suitable tool and cut to the desired length of the molding. The moldings obtained, in this case rings having a length of 5 mm, an external diameter of 5 mm and a central hole of 2.5 mm, are dried at a temperature of 85° C. for 24 hours. The ring support bodies according to the invention have a surface area (BET surface area) of 190 $m^2/g$ and a pore volume of 1.1 ml/g. The support is subsequently also sintered at 1020° C. The ring support bodies according to the invention have a surface area (BET surface area) of 150 $m^2/g$ and a pore volume of 0.9 ml/g. The mechanical strength of the rings is 39 $N/mm^2$.

Example 17

23.1 kg of twice-distilled $H_2O$ are placed in a 60 liter plastic beaker. 4.5 kg of pyrogenic silicon dioxide (BET surface area 400 $m^2/g$) are stirred in at 1000 rpm by means of a plastic-coated high-speed stirrer disk. The mixture is subsequently stirred for another 25 minutes at a circumferential velocity of the high-speed stirrer disk of 10 m/s. 2.5 kg of pyrogenic aluminum oxide (BET surface area 200 $m^2/g$) are added. The mixture is subsequently stirred for another 30 minutes at a circumferential velocity of the high-speed stirrer disk of 12 m/s. The slip is transferred to a planetary mixer having 2 plastic-coated bar stirrers. 180 g of 1% $NH_3$ solution are added dropwise at 100 rpm. After the addition is complete, the mixture is stirred for another 5 minutes. The mixture is then introduced into a ram extruder. In parallel, the rheology and pH of a sample are measured: G'=350,000, G"=80,000, pH=7.0.

The composition is extruded to the desired shapes in a ram extruder through a suitable tool and cut to the desired length of the molding. The moldings obtained, in this case rings having a length of 6 mm and an external diameter of 6 mm and an internal diameter of 2.5 mm, are dried at a temperature of 85° C. for 24 hours. The moldings according to the invention have a BET surface area of 260 $m^2/g$ and a pore volume of 1.1 ml/g. The support is subsequently also sintered at 950° C. The moldings according to the invention have a surface area (BET surface area) of 200 $m^2/g$ and a pore volume of 1.0 ml/g. The mechanical strength of the rings is 58 $N/mm^2$.

Example 18

23.1 kg of twice-distilled $H_2O$ are placed in a 60 liter plastic beaker. 5 kg of pyrogenic silicon dioxide (BET surface area 300 $m^2/g$) are stirred in at 1000 rpm by means of a plastic-coated high-speed stirrer disk. The mixture is subsequently stirred for another 25 minutes at a circumferential velocity of the high-speed stirrer disk of 10 m/s. 2 kg of pyrogenic titanium dioxide (BET surface area 300 $m^2/g$) are added. The mixture is subsequently stirred for another 30 minutes at a circumferential velocity of the high-speed stirrer disk of 12 m/s. The slip is transferred to a planetary mixer having 2 plastic-coated bar stirrers. 155 g of 1% $NH_3$ solution are added dropwise at 100 rpm. After the addition is complete, the mixture is stirred for another 5 minutes. The mixture is then introduced into a ram extruder. In parallel, the rheology and pH of a sample are measured: G'=230,000, G"=27,000, pH=5.9.

The composition is extruded to the desired shapes in a ram extruder through a suitable tool and cut to the desired length of the molding. The moldings obtained, in this case rings having a length of 6 mm, an external diameter of 6 mm and a central hole of 2.5 mm, are dried at a temperature of 85° C. for 24 hours. The ring support bodies according to the invention have a surface area (BET surface area) of 250 $m^2/g$ and a pore volume of 1.1 ml/g. The support is subsequently also sintered at 950° C. The ring support bodies according to the invention have a surface area (BET surface area) of 210 $m^2/g$ and a pore volume of 1.0 ml/g. The mechanical strength of the rings is 54 $N/mm^2$.

Example 19

1155 g of twice-distilled $H_2O$ are placed in a 4 liter plastic beaker. 345 g of pyrogenic silicon dioxide (BET surface area 400 m²/g) are stirred in at 1000 rpm by means of a plastic-coated high-speed stirrer disk. The mixture is subsequently stirred for another 40 minutes at a circumferential velocity of 14 m/s. The slip is transferred to a planetary mixer having 2 plastic-coated bar stirrers. 8.5 g of 1% $NH_3$ solution are added dropwise at 100 rpm. The pH of the resulting composition is 6.4. 45 mg of $Na_2SiO_3$ are then added. After the addition is complete, the mixture is stirred for another 5 minutes.

The mixture is then introduced into a ram extruder. In parallel, the rheology of a sample is measured: G'=320,000, G"=35,000.

The composition is extruded to the desired shapes in a ram extruder through a suitable tool and cut to the desired length of the molding. The moldings obtained, in this case pellets having a length of 6 mm, a diameter of 6 mm, are dried at a temperature of 85° C. for 24 hours. The molding is subsequently also sintered at 850° C. The moldings according to the invention have a surface area (BET surface area) of 205 m²/g and a pore volume of 0.75 ml/g. The mechanical strength of the pellets is 35 N/mm². The corresponding purity values are shown in table 1.

Example 20

1155 g of twice-distilled $H_2O$ are placed in a 4 liter plastic beaker. 345 g of pyrogenic silicon dioxide (BET surface area 400 m²/g) are stirred in at 1000 rpm by means of a plastic-coated high-speed stirrer disk. The mixture is subsequently stirred for another 40 minutes at a circumferential velocity of 10 m/s. The slip is transferred to a planetary mixer having 2 plastic-coated bar stirrers. 12.0 g of 1% $NH_3$ solution are added dropwise at 100 rpm. After the addition is complete, the mixture is stirred for another 5 minutes. The mixture is then introduced into a ram extruder. In parallel, the rheology and pH of a sample are measured: G'=120,000, G"=15,000, pH=9.5.

The composition is extruded to the desired shapes in a ram extruder through a suitable tool and cut to the desired length of the molding. The moldings obtained, in this case pellets having a length of 6 mm, a diameter of 6 mm, are dried at a temperature of 85° C. for 24 hours. The support is subsequently also sintered at 1000° C. The moldings according to the invention have a surface area (BET surface area) of 203 m²/g and a pore volume of 0.76 ml/g. The mechanical strength of the pellets is 33 N/mm². The corresponding purity values are shown in table 1.

Example 21

1155 g of twice-distilled $H_2O$ are placed in a 4 liter plastic beaker. 345 g of pyrogenic silicon dioxide (BET surface area 400 m²/g) are stirred in at 1000 rpm by means of a plastic-coated high-speed stirrer disk. The mixture is subsequently stirred for another 40 minutes at a circumferential velocity of 10 m/s. The slip is transferred to a planetary mixer having 2 plastic-coated bar stirrers. 10.0 g of 1% $NH_3$ solution are added dropwise at 100 rpm. After the addition is complete, the mixture is stirred for another 5 minutes. The mixture is then introduced into a ram extruder. In parallel, the rheology and pH of a sample are measured: G'=150,000, G"=21,000, pH=8.5.

The composition is extruded to the desired shapes in a ram extruder through a suitable tool and cut to the desired length of the molding. The moldings obtained, in this case pellets having a length of 6 mm, a diameter of 6 mm, are dried at a temperature of 85° C. for 24 hours. The support is subsequently also sintered at 1000° C. The moldings according to the invention have a surface area (BET surface area) of 203 m²/g and a pore volume of 0.76 ml/g. The mechanical strength of the pellets is 73 N/mm². The corresponding purity values are shown in table 1.

What is claimed is:

1. A porous metal oxide molding, prepared by a process comprising:
    a) finely dispersing in water particles of at least one pyrogenic metal oxide selected from the group consisting of silicon dioxide, aluminum oxide, titanium dioxide, and zirconium dioxide to form an aqueous dispersion containing at least 5 weight percent of metal oxide based on the weight of the aqueous dispersion;
    b) increasing the pH of the aqueous dispersion to form a viscoelastic solid;
    c) shaping the viscoelastic solid to a green body molding;
    d) drying the green body molding at a temperature less than a calcination temperature; and
    e) optionally calcining the green body molding at a calcination temperature of at least 500° C. to form a calcined molding,
wherein the aqueous dispersion is free of organic solvents and also free of organic and inorganic binders, the green body molding is dimensionally stable with a strength greater than 2 N/mm², and the green body molding contains less than 50 ppm by weight of carbon.

2. The porous metal oxide molding of claim 1 which is a green body molding.

3. The green body molding of claim 2, having a carbon content of less than 1 ppm based on the total weight of the green body molding.

4. The green body molding of claim 2 which has a strength of greater than 10 N/mm².

5. The porous metal oxide molding of claim 1, which is calcined, and has a strength greater than 30 N/mm².

6. The porous metal oxide molding of claim 1, wherein the metal oxides consist of pyrogenic silicon dioxide.

7. The porous metal oxide molding of claim 1, which is a green body molding having a BET surface area between 50 m²/g and 500 m²/g and a pore volume from 0.7 ml/g to 1.8 ml/g.

8. The porous metal oxide molding of claim 1, which is calcined to a calcined molding which has a BET surface area of from 30 m²/g to 400 m²/g and a pore volume from 0.5 ml/g to 1.5 ml/g.

9. The porous metal oxide molding of claim 1, wherein the aqueous dispersion of step a) contains at most 65 weight percent of metal oxides based on the weight of the dispersion.

10. The porous metal oxide molding of claim 1, which contains non-silicon impurities selected from the group consisting of metals, sulfur, phosphorus, and carbon, and the sum of the non-silicon impurities is <400 ppm based on the total weight of the molding.

11. The porous metal oxide molding of claim 1, which contains non-silicon impurities selected from the group consisting of metals, sulfur, phosphorus, and carbon, and the sum of the non-silicon impurities is <50 ppm based on the total weight of the molding.

12. The porous metal oxide molding of claim 1, which contains non-silicon impurities selected from the group consisting of metals, sulfur, phosphorus, and carbon, and the sum of the non-silicon impurities is <10 ppm based on the total weight of the molding.

13. The porous metal oxide molding of claim 1, which contains non-silicon impurities selected from the group consisting of metals, sulfur, phosphorus, and carbon, and the sum of the non-silicon impurities is <1 ppm based on the total weight of the molding.

14. The porous metal oxide molding of claim 1, which contains sulfur and/or phosphorus as an impurity, in a concentration of less than 5 ppm based on the weight of the porous metal oxide molding.

15. The porous metal oxide molding of claim 1, which contains carbon in a concentration of less than 1 ppm based on the weight of the porous metal oxide molding.

16. The porous metal oxide molding of claim 1, wherein in step a), the pyrogenic metal oxide(s) have a BET surface area of from 150-450 $m^2/g$.

17. A porous metal oxide molding, prepared by a process comprising:
   a) finely dispersing in water particles of at least one pyrogenic metal oxide having a BET surface area of 30-500 $m^2/g$ selected from the group consisting of silicon dioxide, aluminum oxide, titanium dioxide, and zirconium dioxide to form an aqueous dispersion containing at least 5 weight percent of metal oxide based on the weight of the aqueous dispersion;
   b) increasing the pH of the aqueous dispersion to form a viscoelastic solid;
   c) shaping the viscoelastic solid to a green body molding;
   d) drying the green body molding at a temperature less than a calcination temperature; and
   e) optionally calcining the green body molding at a calcination temperature of at least 500° C. to form a calcined molding, wherein the aqueous dispersion is free of organic solvents and also free of organic and inorganic binders, the green body molding is dimensionally stable with a strength greater than 2 $N/mm^2$, and the green body molding contains less than 50 ppm by weight of carbon.

18. The porous metal oxide molding of claim 17, wherein after calcination, the BET surface area is from 30 $m^2/g$ to 400 $m^2/g$.

* * * * *